United States Patent
Ezumi et al.

(10) Patent No.: US 6,745,929 B1
(45) Date of Patent: Jun. 8, 2004

(54) METHOD OF MANUFACTURING STRUCTURAL BODY AND STRUCTURAL BODY

(75) Inventors: Masakuni Ezumi, Kudamatsu (JP);
Akihiro Satou, Kudamatsu (JP);
Kazushige Fukuyori, Kudamatsu (JP)

(73) Assignee: Hitachi, Ltd., Tokyo (JP)

( * ) Notice: Subject to any disclaimer, the term of this patent is extended or adjusted under 35 U.S.C. 154(b) by 0 days.

(21) Appl. No.: 09/719,627

(22) PCT Filed: Jun. 15, 1998

(86) PCT No.: PCT/JP99/03164
§ 371 (c)(1),
(2), (4) Date: Feb. 23, 2001

(87) PCT Pub. No.: WO99/65637
PCT Pub. Date: Dec. 23, 1999

(30) Foreign Application Priority Data

Jun. 16, 1998 (JP) ............................................. 10/168017

(51) Int. Cl.⁷ .............................. B23K 20/12; B24C 1/00
(52) U.S. Cl. ...................................... 228/112.1; 228/162
(58) Field of Search .............................. 228/112.1, 113, 228/114, 162, 2.1; 428/598, 593, 687

(56) References Cited

U.S. PATENT DOCUMENTS

| | | | | |
|---|---|---|---|---|
| 3,800,472 A | * | 4/1974 | Nagy | 49/426 |
| 5,077,459 A | * | 12/1991 | Heumiller | 219/117.1 |
| 5,098,007 A | * | 3/1992 | Tsuruda et al. | 228/125 |
| 5,491,030 A | * | 2/1996 | Asai et al. | 428/433 |
| 5,611,479 A | | 3/1997 | Rosen | |
| 6,050,474 A | * | 4/2000 | Aota et al. | 228/112.1 |

FOREIGN PATENT DOCUMENTS

| | | |
|---|---|---|
| EP | 0579500 | 1/1994 |
| EP | 0797043 | 9/1997 |
| EP | 0893190 | 1/1999 |
| JP | 58-207970 | * 12/1983 |
| JP | 61-17384 | 1/1986 |
| JP | 2-108459 | 4/1990 |
| JP | 2-279457 | 11/1990 |
| JP | 8-141889 | 6/1996 |
| JP | 11-285862 | 10/1999 |
| JP | 2000-234699 | * 8/2000 |

OTHER PUBLICATIONS

Office Action from Japanese Patent Office dated Dec. 10, 2001 in corresponding Japanese Patent Application.
Patent Abstracts of Japan, Pub. No. 61149481, Pub. Date—Jul. 8, 1986.

* cited by examiner

*Primary Examiner*—John J. Zimmerman
(74) *Attorney, Agent, or Firm*—Antonelli, Terry, Stout & Kraus, LLP

(57) ABSTRACT

Plural extrusion members 100, each having plural ribs 105 formed on one surface of a face plate 101, are mounted on a frame 40 with the surface not having the ribs 105 facing downward, and with the end regions of the adjacent members 100, 100 being butted to each other. Then, the end regions of said members 100 are welded using friction stir welding from the upper direction with a rotary body 20, and then a hairline finish is applied to said surface not having the ribs, which constitutes the exterior surface of the vehicle body. In this way, there is substantially no need to cut off the joint bead, which improves the appearance of the vehicle body and reduces the manufacturing cost.

3 Claims, 1 Drawing Sheet

METHOD OF MANUFACTURING STRUCTURAL BODY AND STRUCTURAL BODY

FIELD OF THE INVENTION

The present invention relates to a method for joining extrusion members through friction stir welding so as to manufacture a structural body, for example a vehicle.

DESCRIPTION OF THE RELATED ART

As disclosed in Japanese Patent Laid-Open Publication No. 9-309164 (EP 0797043A2), a friction stir welding is a technique in which a round shaft (called a rotary body) is rotated and inserted in the joint region of members to be joined, and the rotary body is moved along the junction line, thereby heating, mobilizing and plasticising the material, whereby a solid-phase welding of the members is achieved. The rotary body comprises a small-diameter portion to be inserted into the joint region, and a large-diameter portion to be positioned externally of the joint. The small-diameter portion and the large-diameter portion are coaxial, and the large-diameter side is coupled to a drive source. The boundary between the small-diameter portion and the large diameter portion is partially inserted into the joint region during welding. The joining of members performed by the friction stir welding method can be applied to both a butt joint and a lap joint.

Moreover, as shown in FIG. 7 of the above-mentioned publication, the joint region of the two members are provided with a protrusion extending toward the rotary body, which is to be used in the friction stir welding.

One example of the technique for manufacturing a railway car is disclosed in Japanese Patent Publication No. 6-45340, wherein the vehicle body of a railway car is manufactured by welding together extruded members made of aluminum alloy. The extruded member is equipped with a plural number of ribs provided on one surface of a face plate, which is placed on a frame with the surface not having the ribs facing downward, and welding is performed from the side having the ribs. The welding process is carried out so that a weld bead is formed on the back surface of the frame.

Since the surface without the ribs is used as the exterior surface of the vehicle body, the weld bead formed on the back surface can be cut off to form a smooth surface. Thereafter, a hairline finishing processe is performed on the exterior surface of the body. If necessary, a transparent coating is further applied to the surface. Or, in another example, the weld bead is cut off and putty is applied to the surface before the coating is applied.

SUMMARY OF THE INVENTION

Since the weld bead formed on the exterior surface of the vehicle body must be removed when the vehicle body is fabricated using a conventional welding process, the manufacturing process involves an increased number of steps. Moreover, when welding the vehicle body, the material is heated to a very high temperature, which causes deformation of the surfaces of the vehicle, and thereby deteriorates the appearance thereof. If the vehicle body is completed by a hairline finishing without coating the vehicle body, the weld bead formed at the welding portion degrades the appearance of the vehicle body. The weld bead varies in width and has a wavy appearance. This is why the weld bead degrades the exterior appearance of the body. Even if transparent coating is applied to the body after the hairline finishing, the appearance is not improved.

An object of the present invention is to manufacture a structural body, such as a vehicle body, having an attractive appearance using a friction stir welding method.

The foregoing object of the present invention is achieved by:

abutting the ends of the face plates of two members;

friction stir welding said ends of said face plates from only one side of said surface; and performing buffing, blasting or coating on the opposite side of said surface from which said friction stir welding is performed, thereby finishing said surface to form the exterior surface of a structural body.

DETAILED DESCRIPTION OF A PREFERRED EMBODIMENT

Figure 1:
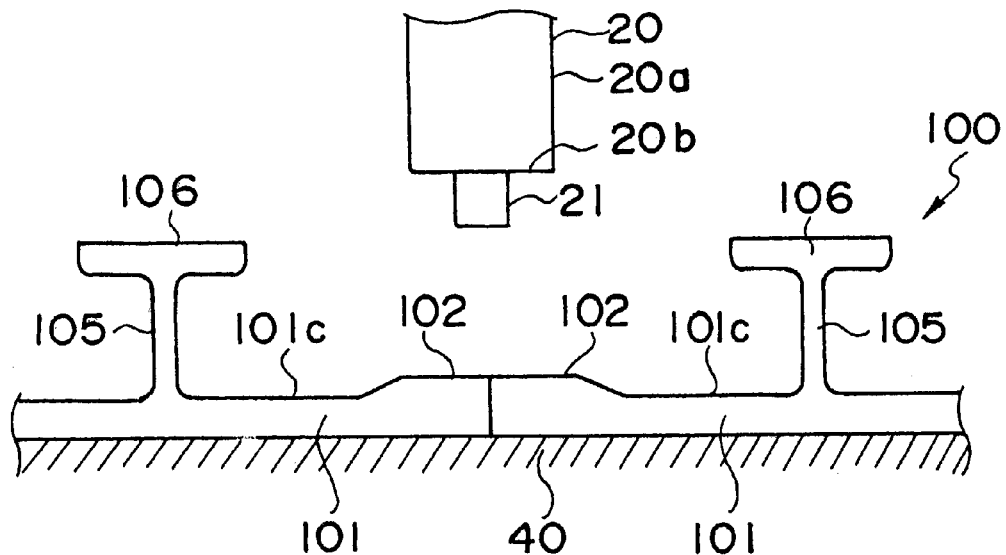
FIG. 1 is a vertical cross-sectional view showing the friction stir welding joint according to one embodiment of the present invention.
Figure 2:
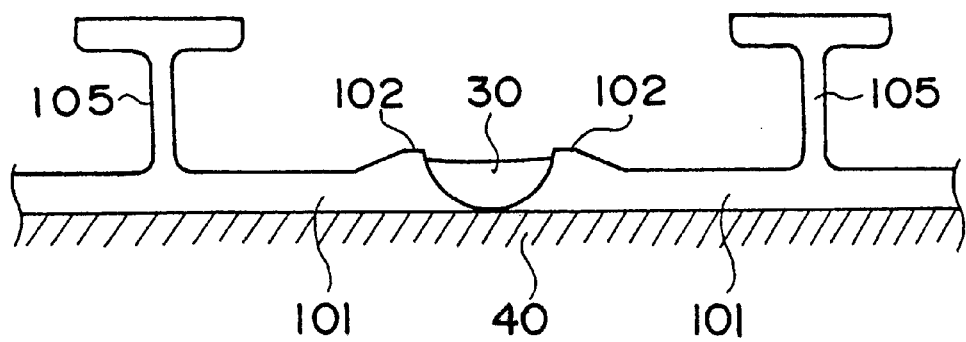
FIG. 2 is a vertical cross-sectional view showing the joint after friction stir welding has been performed.

A preferred embodiment of the present invention will now be explained with reference to FIG. 1 and FIG. 2. The present embodiment represents an application of the present invention to the manufacturing of a body of a railway car. The members to be joined together are, for example, extruded members 100 formed of aluminum alloy. The side structure, the roof structure, the gable structure and the floor structure of the vehicle body of the railway car is formed by joining plural extruded members 100 to one another to form a panel or frame. In the case of the side structure, the roof structure and the floor structure, the length of the member 100 is at maximum equal to the length of the vehicle body. The longitudinal direction of the member 100 is positioned in line with the longitudinal direction of the vehicle body. The gable structure defines the end portion of the vehicle body.

The member 100 comprises a face plate 101 and plural ribs 105 formed to extend from one side surface of the face plate. A plate 106 parallel to the face plate 101 is formed at the tip of each rib 105. After joining plural members together, parts such as pillars, common rafters or mounting seats for equipment are welded to the plates 106. In the case of the side structure, the roof structure and the gable structure of the vehicle body, the surface equipped with the ribs 105 is positioned to face the interior of the vehicle, and the other side faces the exterior of the vehicle.

Each longitudinal edge of the member 100, which abuts against a similar longitudinal edge of another member 100, is equipped with a projected region 102 protruding in the same direction as the ribs 105. The projected region 102 has a certain width and thickness. The projected region 102 may also be called a thick region. The end portion thereof is a perpendicular surface orthogonal to the face plate 101.

When performing friction stir welding, plural members 100 are mounted on a frame 40 with the side equipped with the ribs 105 facing upward. The perpendicular surfaces at the end portions which form the longitudinal edge of each member 100 are placed into contact with one another. In such a state, the members 100 are secured to the frame 40. In this state, the frame 40 provides a support under the area of abutting perpendicular surfaces. During welding, the members 100 are pressed onto a frame 40 from above by a device or a vise or the like so as to be firmly held in position. Moreover, the members are secured on the frame 40 so that the gap formed between the butted end portions of the members 100 is minimized. The number of members 100 mounted on the frame 40 is two or more.

The friction stir welding is performed in such a state. During the welding, rollers are utilized that move along with the movement of the rotary body 20, which performs the friction stir welding. The rollers are positioned in front of and behind the rotary body 20 in the direction of movement of the body 20. These rollers press either on the left and right sides of the projected regions 102 or on the upper surface of the projected regions.

The rotary body 20 comprises a small-diameter portion 21 formed on the tip of a round rod having a larger diameter. The boundary 20b between the large-diameter portion 20a and the small-diameter portion 21 of the rotary body 20 is formed to have an arc shape which is concave toward the large-diameter portion 20a. The small-diameter portion is provided in the form of a screw. The welding is performed by rotating the rotary body 20, inserting the same in the joint between the members 100, and moving the rotary body 20 along the joint line. The axial center of the rotary body 20 is positioned so that the large-diameter portion 20a is tilted rearward relative to the direction of movement of the rotary body 20. Therefore, the rear end of the boundary 20b is inserted slightly into the joint between the members 100, but the front end of the boundary 20b is positioned outside (in the upper direction in FIG. 1) the joint above the outer (upper) surface of the apex of the protruded regions 102. The rear end of the boundary 20b is inserted to a level between the surface of the protruded regions 102 and the outer surface 11c (the surface having the ribs 105, i.e., the upper surface in FIG. 1) of the face plate 101 of the non-protruded regions. The terms "rear end" and "front end" are based on the direction of movement of the rotary body 20. The tip of the small-diameter portion 21 does not penetrate the members 100, but comes into close proximity with the frame 40.

The total width obtained by adding the width of the apex of the two protruded regions 102 is greater than the diameter of the large-diameter portion 20a of the rotary body 20. The widths of each of the two protruded regions are the same. The rotary center axis of the rotary body 20 is positioned at the center of the total width of the two protruded regions.

Though the side surfaces of the members 100 are abutted against each other, since the members 100 are long, there may be areas where these surfaces do not contact one another. The gap formed in such case is filled by the metal flowing from the protruded regions 102. The outer surface (the upper surface in FIG. 2) of the joint welding bead 30 formed in the protruded regions 102 is concave relative to the surrounding protruded regions 102. The outer surface of the joint welding bead 30 is somewhat arc-shaped, with a concave center.

After the bonding, the resulting structural body is further joined to another structural body through friction stir welding or normal welding so as to form a vehicle body. After forming the vehicle body, hairline finishing is performed in necessary areas of the outer (exterior) surface of the vehicle body, such as the outer side structure or the gable structure, in order to finish the body. Especially, the side structure is required to have an attractive surface appearance.

During the friction stir welding, the tip of the small-diameter portion 21 will not contact the frame 40, but the influence provided by the small-diameter portion extends downward beyond the tip of the portion 21. The gap, which is formed between the two members 100, is filled with metal and should be as small as possible. Therefore, the two members 100 are substantially joined in the direction of the thickness of the members. Since the exterior surface of the members 100 (the surface on the opposite side from the protruded region 102 and the ribs 105, i.e., the lower surface in FIG. 1) is somewhat cut off during the hairline finishing process, the non-bonded portion existing between the joined members, if any, will become indistinctive. Moreover, even if a small amount of metal flows out from the gap between the butted surface of the members 100 to the exterior surface side of the face plate 101, it will be removed by the hairline finishing. By controlling the welding so that no uneven area is formed on the outer surface of the butted portion, no metal is dispersed and no non-bonded portion is generated, so that the need for other cutting processes become unnecessary. Therefore, a friction stir welding performed from the rib-side of the members makes it possible to provide a hairline-finished vehicle body.

In the case of a normal welding process, the weld bead is discolored depending on the material of the welding rod, and, therefore, even if the protruded weld bead is cut off, the hairline finishing causes the weld bead to stand out, which degrades the appearance of the surface. Even if the material of the welding rod is the same as that of the welded members, the weld bead tends to stand out. However, since the friction stir welding does not involve adding any other material, and since the temperature of the welding is low, less discoloration is observed, and the joint portion becomes less apparent, thereby improving the appearance of the surface.

Even further, since the width of the joint welding bead formed by the friction stir welding is uniform and extends in a straight line, the appearance is improved compared to the normal weld bead.

Moreover, since the friction stir welding does not melt the members, the process is carried out at a relatively low temperature, and the deformation of the flatness of the face plate in the vicinity of the joint regions is minimized.

Furthermore, since the protruded region 102 is not formed on the external surface, there is no need to cut off the protruded region 102, and so the cost for carrying out the process is reduced. A normal welding method requires removal of the weld bead formed on the lower surface of the weld (back bead). However, according to the welding method employed in the present embodiment, there is no need to remove the weld bead, and so the cost for carrying out the method is low.

In some cases, after performing the above-mentioned friction stir welding, a transparent coating is applied to the surface of the body.

The hairline finishing process is performed, for example, by rotating a circular cylindrical member having a cloth-file mounted on the outer periphery thereof and filing the face plate 101 and, thereafter, a circular cylindrical member having plural wires equipped thereto is rotated for further filing (cutting) of the surface plate. As explained, the hairline finishing may be classified as a buffing process. Therefore, a buffing process may be performed instead of the hairline finishing process. In another example, a blasting process may be performed. In yet another example, a satin finish (scratch-brush finish) may be applied using a glass-bead blast.

As explained, according to the present embodiment, the side structure and the gable structure manufactured using the friction stir welding method are assembled to form the vehicle body, and the exterior surface of the formed body is then finished by buffing or a blasting process, thereby providing a vehicle body with an improved appearance at a low cost. The present embodiment is especially effective when applied to an easily-visible side structure.

Even if a non-transparent coating is applied to the face plate, the number of manufacturing steps necessary will be reduced greatly since there is no need to cut of f the weld bead. The advantages of the present embodiment can easily be understood when compared to the case where the protrusions 102 are positioned outward from the exterior of the vehicle body.

The thickness of the whole area of the face plate 101, starting from the end (protruded region 102) of the member 100 to the rib 105 closest thereto, can be formed thicker than the thickness of the other areas (for example the areas between rib 105 and another rib 105) of the face plate.

When friction stir welding is performed, the plate thickness of the joint bead area becomes thin, but if the strength of the plate is sufficient, the friction stir welding can be applied to members having no protruded areas. In this case, of course, the friction stir welding is performed from the non-exterior surface (for example, the surface with the ribs).

The butted portion of the two members 100 may be sloped so that a gap with a V-shaped cross section opens outward in the direction of the ribs, but in this case, the amount of movement of the plasticised metal from the protrusions 102 must be increased. Moreover, the exterior surface side (the lower side in FIG. 1) of the butted region of the face plates 101 may form a small inverse-V shape.

A hairline finishing process is preferred in the above-mentioned embodiment, but a normal coating finish process can be performed instead of the hairline finishing process.

The present invention may be applied to the case where hollow extruded members are joined to form a structural body or a vehicle body. As disclosed in Japanese Patent Laid-Open Publication No. 9-309164 (EP 0797043A2), hollow extruded members are formed by two parallel face plates and plural ribs connecting the two face plates. As shown in FIG. 7 of this publication, the joint portion is equipped with protrusions extending outward from the outer surface of the members. The protrusions are formed on both outer surfaces of the members. Similar to the embodiment of the present invention, the members shown in the above-referenced FIG. 7 are bonded through friction stir welding performed from the protruded sides. The outer surface of the joint bead is protruded compared to the non-protruded areas of the members. After the welding, one protrusion facing the exterior of the vehicle body is cut off. The cutting is performed so that the joint lies in the same plane as the face plate. Therefore, no surface irregularities exist in the outer surface of the vehicle body. Thereafter, hairline finishing is provided on the outer surface, completing the vehicle body.

According to the prior method described above, the joint region formed by the friction stir welding is cut off to forman even surface. Since friction stir welding causes a small discoloration, removing the joint region provides an attractive outer surface.

Moreover, as disclosed in FIG. 9 of the above-mentioned Japanese Patent Laid-Open Publication No. 9-300164 (EP 0797043A2), the friction stir welding process may be applied to the joining of hollow extruded members from only one side. In the example, the face plate on one side of a hollow extruded member is formed to extend toward the adjacent hollow extruded member. The extended face plates of adjacent members are welded together through friction stir welding, as shown in FIGS. 1 and 2, from the side of the other face plate. Next, the face plates opposite to the bonded face plates are bonded together via a third plate through friction stir welding. Then, a hairline finishing process is carried out on the exterior surface of the protruded face plates (the other side from the friction stir welded surface). The outer surface of said protruded face plate forms a flat plane, as shown in FIG. 2.

The technical scope of the present invention is not limited to the terms used in the claims or in the summary of the present invention, but is extended to the range in which a person skilled in the art could easily find substitutes based on the present disclosure.

The present invention makes it possible to provide a structural body formed through friction stir welding having an improved appearance.

We claim:

1. A method of manufacturing a structural body, comprising the steps of:

(i) butting together respective ends of face plates of two members, wherein each of said face plates includes a protruded region protruding from one side of an end portion of the face plate in a thickness direction of the face plate, the protruded regions being butted against each other, at butted ends of the face plate;

(ii) joining said two members by friction stir welding said butted ends only from said one side having said protruded regions, said friction stir welding being performed so that the other side of said face plates, opposite said one side, is friction-stir-welded substantially flat; and (iii) buffing or blasting said other side of said face plates after performing said friction stir welding, so as to finish said other side of the face plates as an exterior surface of the structural body, wherein each of said two members has a plurality of ribs formed to said one side of said face plate, the method including mounting said members on a frame with said other side of said face plate facing downward, and performing said friction stir welding, and wherein the friction stir welding is performed such that a rotary tool performing the friction stir welding does not penetrate entirely through a thickness of the two members.

2. A method of manufacturing a structural body according to claim 1, wherein the method includes the further step, after said joining, of cutting off said protruded regions so that they constitute a same plane as said face plate.

3. A method of manufacturing a structural body, comprising the steps of:

(i) butting together respective ends of face plates of two members, wherein each of said face plates includes a protruded region protruding from one side of an end portion of the face plate in a thickness direction of the face plate, the protruded regions being butted against each other, at butted ends of the face plates;

(ii) joining said two members by friction stir welding said butted ends only from said one side having said protruded region, thereby forming joined face plates;

(iii) cutting off said protruded regions so that they constitute a same plane as said face plate; and (iv) buffing or blasting the surface of said joined face plates that had said protruded regions cut off, so as to finish said one side as an exterior surface of the structural body.

* * * * *

UNITED STATES PATENT AND TRADEMARK OFFICE
CERTIFICATE OF CORRECTION

PATENT NO. : 6,745,929 B1
DATED : June 8, 2004
INVENTOR(S) : Masakuni Ezumi et al.

It is certified that error appears in the above-identified patent and that said Letters Patent is hereby corrected as shown below:

<u>Title page,</u>
Item [22], PCT Filed, reads "Jun. 15, 1998" change to read -- Jun. 15, 1999 --

Signed and Sealed this

Twenty-eighth Day of June, 2005

JON W. DUDAS
*Director of the United States Patent and Trademark Office*